United States Patent
Hirai et al.

(12) 
(10) Patent No.: US 6,345,172 B1
(45) Date of Patent: Feb. 5, 2002

(54) RADIO SYSTEM WHICH OVERCOMES SIGNAL INTERFERENCE FROM CLOCK OSCILLATION CIRCUIT

(75) Inventors: Koutarou Hirai; Masaki Hoshino, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/515,900

(22) Filed: Aug. 16, 1995

(30) Foreign Application Priority Data

Aug. 30, 1994 (JP) .............................. 6-205108

(51) Int. Cl.[7] ................................. H04B 1/40
(52) U.S. Cl. ......................... 455/76; 455/77; 455/114; 455/310
(58) Field of Search .............................. 455/75, 77, 89, 455/114, 120, 76, 62, 296, 310, 63; 331/28, 1 R (56) References Cited

U.S. PATENT DOCUMENTS

| | | | |
|---|---|---|---|
| 4,002,839 A | * 1/1977 | Karl et al. | |
| 4,550,292 A | * 10/1985 | Smith | ............................ 331/2 |
| 4,870,699 A | * 9/1989 | Garner | ........................ 455/76 |
| 4,879,758 A | 11/1989 | DeLuca et al. | |
| 5,225,792 A | 7/1993 | Prakash | |
| 5,404,378 A | * 4/1995 | Kimura | ........................ 455/63 |
| 5,493,710 A | * 2/1996 | Takahara | .................... 455/259 |
| 5,542,113 A | * 7/1996 | Fink et al. | .................... 455/75 |

FOREIGN PATENT DOCUMENTS

| | | |
|---|---|---|
| EP | 0416423 | 3/1991 |
| EP | 0418149 A2 | 3/1991 |
| GB | 2194696 A | 3/1988 |
| GB | 2250877 A | 6/1992 |
| GB | 2276784 A | 10/1994 |
| JP | 4-150230 A | 5/1992 |
| WO | 9000839 | 1/1990 |

* cited by examiner

Primary Examiner—Edward F. Urban
(74) Attorney, Agent, or Firm—Stevens, Davis, Miller & Mosher, LLP (57) ABSTRACT

A radio system has a transmitting circuit for tuning in a transmitting frequency at a desired frequency, a control circuit for performing control of the whole of the radio system, a clock oscillation circuit operative to generate a reference clock for the control circuit, a memory circuit operative to store conditions for switching the oscillation frequency of the reference clock to be generated by the clock oscillation circuit, a comparative arithmetic circuit for comparing a transmitting frequency tuned in by the transmitting circuit with the conditions stored in the memory circuit, and a frequency switching circuit for switching the oscillation frequency of the reference clock to be generated by the clock oscillation circuit, on the basis of a result of comparison by the comparative arithmetic circuit. The oscillation frequency of the reference clock to be generated by the clock oscillation circuit is switched by controlling the frequency switching circuit on the basis of a result of comparison by the comparative arithmetic circuit.

6 Claims, 8 Drawing Sheets

RADIO SYSTEM WHICH OVERCOMES SIGNAL INTERFERENCE FROM CLOCK OSCILLATION CIRCUIT

BACKGROUND OF THE INVENTION

The present invention relates to a radio system of the type typically represented by a portable telephone system which tunes in the transmitting channel and the receiving channel at desired frequencies. More specifically, the present invention is concerned with elimination of deterioration in radio characteristics which is due to radiation of a fundamental wave and N-th harmonic of a reference clock generated by a clock oscillation circuit built in the radio system.

In recent years, such a small-sized portable radio system as typically represented by a portable telephone system which tunes in the transmitting frequency or the receiving frequency at a desired frequency has been widely exemplified as using a microprocessor which has one chip incorporating many functions in order to realize a reduction in size and weight, a reduction in power consumption, a reduction in cost and a high-class function. When using the microprocessor, there is need for a clock oscillation means operative to generate a reference clock for synchronization. However, the clock oscillation means sometimes radiates the fundamental wave and N-th harmonic of the reference clock in the form of electromagnetic waves into a free space and when the frequencies of the electromagnetic waves coincide with, or are very close to, that of the transmitting channel or the receiving channel, the electromagnetic waves representative of the fundamental wave and N-th harmonic interfere with an electromagnetic wave representative of the transmitting or receiving channel to deteriorate radio characteristics such as a transmitting characteristic and a receiving characteristic.

Methods for elimination of a deterioration in radio characteristics have hitherto been employed including: a method of isolating all portions liable to radiate the fundamental wave and N-th harmonic of a reference clock, for example, isolating wiring conductors associated with the reference clock from the other wiring conductors by shielding the former wiring conductors with a ground line or isolating parts associated with the reference clock from radio means by enclosing these parts with a shield case made of metal; and a method of suppressing the radiation level by confirming portions liable to radiate the fundamental wave and N-th harmonic of the reference clock through, for example, trial production and adding capacitors to these portions.

Figure 8:
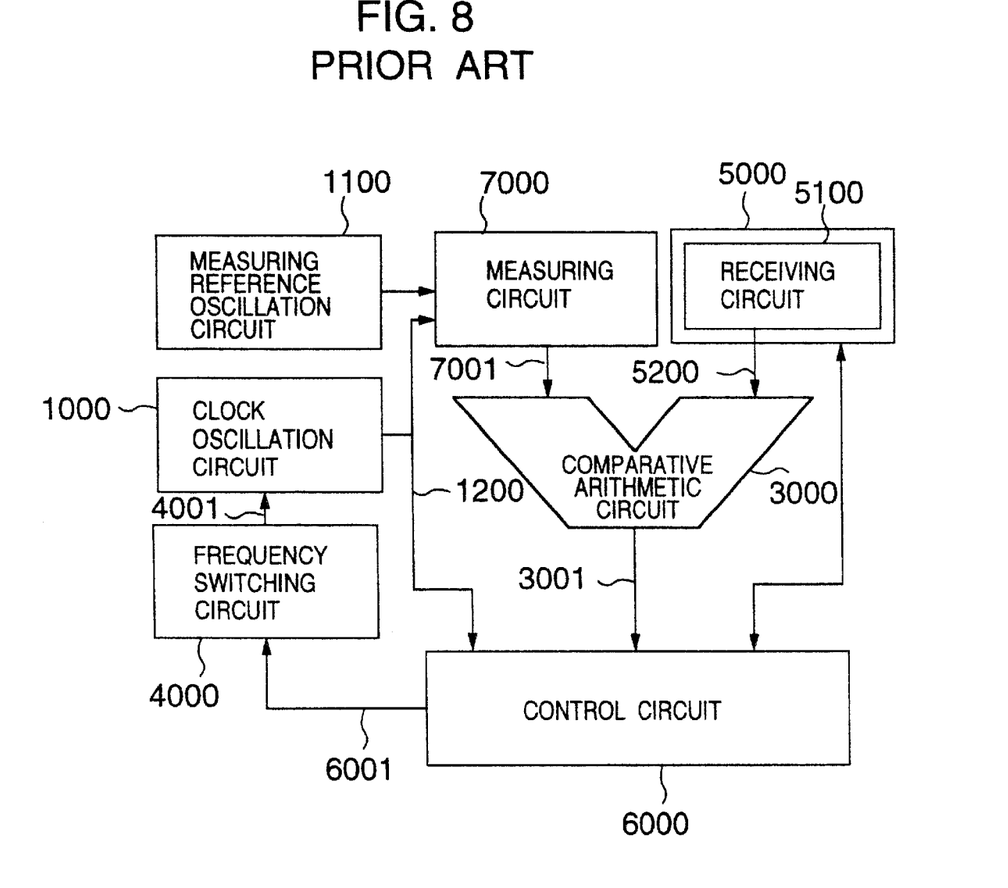
FIG. 8 is a block diagram showing the construction of a prior art example.

JP-A-4-150230 discloses a conventional construction which can systematically achieve such elimination. In the conventional construction, there are provided as shown in FIG. 8 a receiving circuit 5100 for tuning in the receiving frequency at a desired frequency, a control circuit 6000 for performing control of the whole of a radio system, a clock oscillation circuit 1000 adapted to generate a reference clock signal 1200 for the control circuit 6000, a measuring reference oscillation circuit 1100 for generating a highly accurate oscillation frequency which serves as a reference of measurement of the oscillation frequency of the reference clock 1200, a measuring circuit 7000 for measuring the frequency of the reference clock 1200 generated by the clock oscillation circuit 1000 in relation to the reference of the oscillation frequency of the measuring reference oscillation circuit 1100, a comparative arithmetic circuit 3000 for comparing a receiving frequency 5200 tuned in by the receiving circuit 5100 with a result of measurement by the measuring circuit 7000, and a frequency switching circuit 4000 for switching the oscillation frequency of the reference clock 1200 generated by the clock oscillation circuit 1000 on the basis of a result of comparison by the comparative arithmetic circuit 3000.

Next, the operation of the aforementioned prior art example will be described. In the prior art example, when the radio system is started, the control circuit 6000 begins to initialize the individual circuits. At that time, the frequency switching circuit 4000 delivers a switching signal 4001 for setting the oscillation frequency of the reference clock 1200 to be generated by the clock oscillation circuit 1000 to a first oscillation frequency. The clock oscillation circuit 1000 applied with the switching signal 4001 sets the oscillation frequency of the reference clock 1200 to the first oscillation frequency. The measuring circuit 7000 then begins to accurately measure the oscillation frequency of the reference clock 1200 to be generated by the clock oscillation circuit 1000 in relation to the reference of the oscillation frequency of the measuring reference oscillation circuit 1100. When the initialization ends, the control circuit 6000 controls the receiving circuit 5100 to cause it to sequentially scan receiving frequencies, tune in a desired frequency and begin to receive the desired frequency. At that time, the comparative arithmetic circuit 3000 compares the receiving frequency tuned in by the receiving circuit 5100, the oscillation frequency of the reference clock 1200 measured by the measuring circuit 7000, whereby when radiation of the fundamental wave and N-th harmonic of the reference clock 1200 is decided to be of frequencies which interfere with the receiving frequency tuned in by the receiving circuit 5100, the frequency switching circuit 4000 delivers a switching signal 4001 for setting the oscillation frequency of the reference clock 1200 to be generated by the clock oscillation circuit 1000 to a second oscillation frequency. The clock oscillation circuit 1000 applied with the switching signal 4001 sets the oscillation frequency of the reference clock 1200 to the second oscillation frequency. The comparative arithmetic circuit 3000 then compares the receiving frequency tuned in by the receiving circuit 5100 with the oscillation frequency of the reference clock 1200 measured by the measuring circuit 7000, whereby when radiation of the fundamental wave and N-th harmonic of the reference clock 1200 is decided to be of frequencies which do not interfere with the receiving frequency tuned in by the receiving circuit 5100, the frequency switching circuit 4000 delivers a switching signal 4001 for setting the oscillation frequency of the reference clock 1200 to be generated by the clock oscillation circuit 1000 to the first oscillation frequency. The clock oscillation circuit 1000 applied with the switching signal 4001 sets the oscillation frequency of the reference clock 1200 to the first oscillation frequency.

Thus, by alternately switching the oscillation frequency of the reference clock 1200 to be generated by the clock oscillation circuit 1000 to the first and second frequencies in accordance with a receiving frequency tuned in by the receiving circuit 5100, radiation of electromagnetic waves of the fundamental wave and N-th harmonic of the reference clock generated by the clock oscillation circuit 1000 can be prevented from interfering with that receiving frequency tuned in by the receiving circuit 5100, thereby eliminating a deterioration in radio characteristics.

However, in the conventional radio system described as above, a shield case made of metal, for example, is needed which prevents the influence of electromagnetic waves of the fundamental wave and N-th harmonic of the reference clock signal radiated from portions associated with the clock oscillation circuit, in order to eliminate a deterioration in radio characteristics, raising a problem that a reduction in size and weight is difficult to achieve, and when suppressing the radiation level of electromagnetic waves of the fundamental wave and N-th harmonic of the reference clock signal by adding capacitors, it is very difficult to predict, during the design procedure, portions to which capacitors are added and hence radiating portions must be confirmed once by using a trial product of the radio system, raising a problem that the period for design and development of the radio system is considerably prolonged. Further, in the method for suppressing the radiation level, there is a possibility that the elimination effect cannot be obtained with some products depending on irregularity in parts and production, raising a problem that the yield during production is degraded.

Further, in JP-A-4-150230 additionally provided with the measuring reference oscillation circuit 1100, replacement of this circuit with software means inside the microprocessor is difficult to achieve and therefore, a separate oscillation circuit must be provided, increasing the circuit scale. In addition, radiation of the fundamental wave and N-harmonic of the oscillation frequency of the measuring reference oscillation circuit 1100 also deteriorates radio characteristics, raising a problem that the comparative arithmetic processing by the comparative arithmetic circuit 3000 must simultaneously cope with this type of deterioration in radio characteristics and so becomes complicated.

SUMMARY OF THE INVENTION

The present invention contemplates elimination of the aforementioned problems and it is an object of the invention to provide a radio system in which circuits and construction of the radio system can be simplified by reducing weight and size so as to decrease the period for development and design and to improve productivity.

To solve the above problems, a radio system according to the present invention comprises radio means for tuning in a desired frequency, control means for performing control of the whole of the radio system, clock oscillation means operative to generate a reference clock for the control means, memory means operative to store conditions for switching the oscillation frequency of the reference clock to be generated by the clock oscillation means, comparative arithmetic means for comparing a frequency tuned in by the radio means with the conditions stored in the memory means, and frequency switching means for switching the oscillation frequency of the reference clock to be generated by the clock oscillation means, on the basis of a result of comparison by the comparative arithmetic means, wherein the oscillation frequency of the reference clock to be generated by the clock oscillation means is switched by controlling the frequency switching means on the basis of a result of comparison by the comparative arithmetic means.

Also, to solve the above problems, a radio system according to the present invention comprises radio means for tuning in a desired frequency, control means for performing control of the whole of the radio system, clock oscillation means operative to generate a reference clock for the control means, memory means for storing frequencies to be tuned in by the radio means and conditions for switching the oscillation frequency of the reference clock to be generated by the clock oscillation means, and frequency switching means for switching the oscillation frequency of the reference clock to be generated by the clock oscillation means on the basis of the conditions stored in the memory means, wherein the radio means tunes in a frequency stored in the memory means and the oscillation frequency of the reference clock to be generated by the clock oscillation means is switched by controlling the frequency switching means on the basis of a condition stored in the memory means and corresponding to the tuned-in frequency.

Accordingly, with the construction of the present invention described above, the frequency switching means is controlled on the basis of a frequency tuned in by the radio means and the memory contents stored in the memory means to switch the oscillation frequency of the reference clock to be generated by the clock oscillation means, whereby radiation of electromagnetic waves of fundamental wave and N-th harmonic of the reference clock of the clock oscillation means can be prevented from interfering with a frequency being tuned in and a deterioration in radio characteristics can be eliminated steadily.

DESCRIPTION OF THE PREFERRED EMBODIMENTS

The present invention will now be described by way of example with reference to FIGS. 1 to 7.

Figure 1:
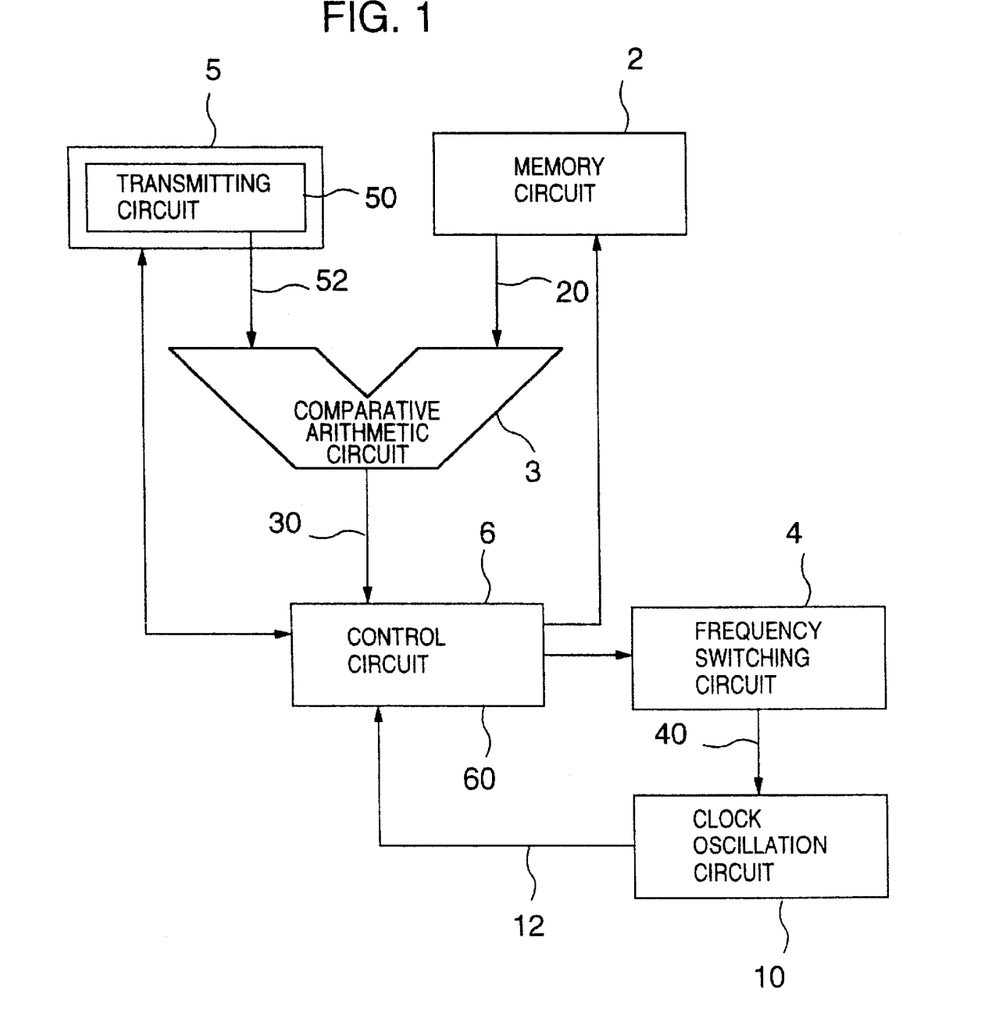
FIG. 1 is a block diagram showing the construction of a radio system according to a first embodiment of the present invention.

FIG. 1 is a schematic diagram showing the construction of a first embodiment of the present invention. As shown in FIG. 1, a radio system of the present embodiment comprises a radio unit 5 having a transmitting circuit 50 for tuning in the transmitting frequency at a desired frequency, a control circuit 6 for performing control of the whole of the radio system, a clock oscillation circuit 10 operative to generate a reference clock 12 for the control circuit 6, a memory circuit 2 operative to store conditions for switching the oscillation frequency of the reference clock 12 to be generated by the clock oscillation circuit 10, a comparative arithmetic circuit 3 for comparing a transmitting frequency tuned in by the transmitting circuit 50 with the conditions stored in the memory circuit 2, and a frequency switching circuit 4 for switching the oscillation frequency of the reference clock 12 to be generated by the clock oscillation circuit 10 on the basis of a result of comparison by the comparative arithmetic circuit 3. Next, the operation of the first embodiment described as above will be described. In the first embodiment, when the radio system is started, the control circuit 6 begins to initialize the individual circuits. At that time, the frequency switching circuit 4 delivers a switching signal 40 for setting the oscillation frequency of the reference clock 12 to be generated by the clock oscillation circuit 10 to a first oscillation frequency. The clock oscillation circuit 10 applied with the switching signal 40 sets the oscillation frequency of the reference clock 12 to the first oscillation frequency. When the initialization ends, the control circuit 6 controls the transmitting circuit 50 so as to cause it to sequentially scan transmitting frequencies, tune in a desired frequency and begin to transmit the tuned-in frequency. At that time, the comparative arithmetic circuit 3 always compares the transmitting frequency tuned in by the transmitting circuit 50 with the conditions stored in the memory circuit 2, whereby when radiation of fundamental wave and N-th harmonic of the reference clock 12 is decided to be of frequencies which interfere with the transmitting frequency tuned in by the transmitting circuit 50, the frequency switching circuit 4 delivers a switching signal 40 for setting the oscillation frequency of the reference clock 12 to be generated by the clock oscillation circuit 10 to a second oscillation frequency. The clock oscillation circuit 10 applied with the switching signal 40 sets the oscillation frequency of the reference clock 12 to the second oscillation frequency. Then, the comparative arithmetic circuit 3 compares the transmitting frequency tuned in by the transmitting circuit 50 with the conditions stored in the memory circuit 2, whereby when radiation of fundamental wave and N-th harmonic of the reference clock 12 is decided not to be of frequencies which interfere the transmitting frequency tuned in by the transmitting circuit 50, the frequency switching circuit 4 delivers the switching signal 40 for setting the oscillation frequency of the reference clock 12 to be generated by the clock oscillation circuit 10 to the first oscillation frequency. The clock oscillation circuit 10 applied with the switching signal 40 sets the oscillation frequency of the reference clock 12 to the first oscillation frequency.

Thus, by alternately switching the oscillation frequency of the reference clock 12 to be generated by the clock oscillation circuit 10 to the first and second frequencies in accordance with a transmitting frequency tuned in by the transmitting circuit 50, radiation of electromagnetic waves of the fundamental wave and N-th harmonic of the reference clock to be generated by the clock oscillation circuit 10 can be prevented from interfering with the transmitting frequency tuned in by the transmitting circuit 50 and a deterioration in transmitting characteristics can be eliminated steadily.

Figure 2:
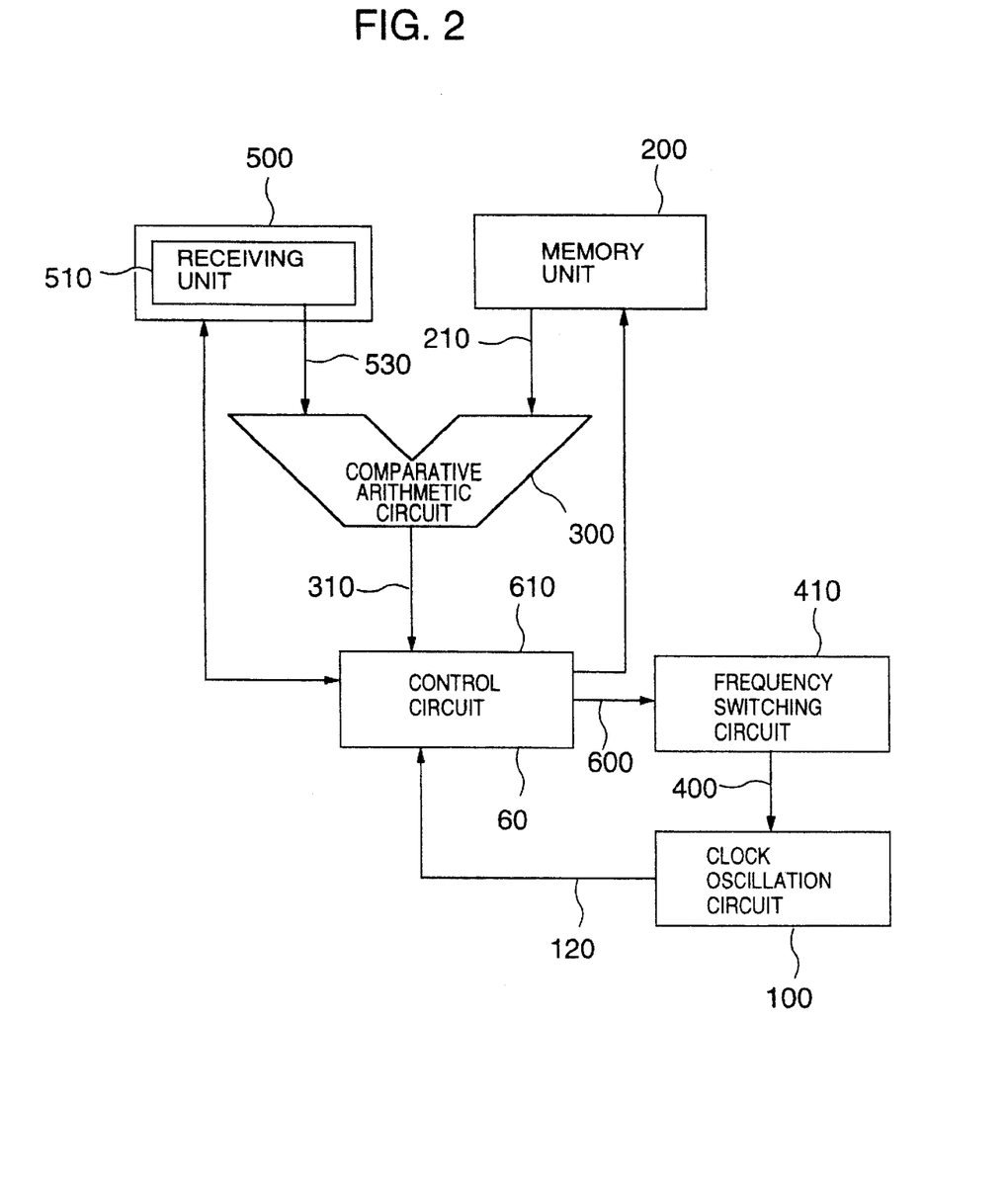
FIG. 2 is a block diagram showing the construction of a radio system according to a second embodiment of the present invention.

FIG. 2 is a schematic diagram showing the construction of a second embodiment of the present invention. As shown in FIG. 2, a radio system of the present embodiment comprises a radio unit 500 having a receiving circuit 510 for tuning in the receiving frequency at a desired frequency, a control circuit 610 for performing control of the whole of the radio system, a clock oscillation circuit 100 operative to generate a reference clock 120 for the control circuit 610, a memory circuit 200 operative to store conditions for switching the oscillation frequency of the reference clock 120 to be generated by the clock oscillation circuit 100, a comparative arithmetic circuit 300 for comparing a receiving frequency tuned in by the receiving circuit 510 with the conditions stored in the memory circuit 200, and a frequency switching circuit 410 for switching the oscillation frequency of the reference clock 120 to be generated by the clock oscillation circuit 100, on the basis of a result of comparison by the comparative arithmetic circuit 300.

Next, the operation of the second embodiment described as above will be described. In the second embodiment, when the radio system is started, the control circuit 610 begins to initialize the individual circuits. At that time, the frequency switching circuit 410 delivers a switching signal 400 for setting the oscillation frequency of the reference clock 120 to be generated by the clock oscillation circuit 100 to a first oscillation frequency. The clock oscillation circuit 100 applied with the switching signal 400 sets the oscillation frequency of the reference clock 120 to the first oscillation frequency. When the initialization ends, the control circuit 610 controls the receiving circuit 510 so as to cause it to sequentially scan receiving frequencies, tune in a desired frequency and begin to receive the tuned-in frequency. At that time, the comparative arithmetic circuit 300 always compares the receiving frequency tuned in by the receiving circuit with the conditions stored in the memory circuit 200, whereby when radiation of fundamental wave and N-th harmonic of the reference clock 120 is decided to be of frequencies which interfere with the receiving frequency tuned in by the receiving circuit 510, the frequency switching circuit 410 delivers a switching signal 400 for setting the oscillation frequency of the reference clock 120 to be generated by the clock oscillation circuit 100 to a second oscillation frequency. The clock oscillation circuit 100 applied with the switching signal 400 sets the oscillation frequency of the reference clock 120 to the second oscillation frequency. Then, the comparative arithmetic circuit 300 compares the receiving frequency tuned in by the receiving circuit 510 with the conditions stored in the memory circuit 200, whereby when radiation of fundamental wave and N-th harmonic of the reference clock 120 is decided not to be of frequencies which interfere with the receiving frequency tuned in by the receiving circuit 510, the frequency switching circuit 410 delivers the switching signal 400 for setting the oscillation frequency of the reference clock 120 to the first oscillation frequency. The clock oscillation circuit 100 applied with the switching signal 400 sets the oscillation frequency of the reference clock 120 to the first oscillation frequency.

Thus, by alternately switching the oscillation frequency of the reference clock 120 to be generated by the clock oscillation circuit 100 to the first and second frequencies in accordance with a receiving frequency tuned in by the receiving circuit 510, radiation of electromagnetic waves of the fundamental and N-th harmonic of the reference clock to be generated by the clock oscillation circuit 100 can be prevented from interfering with the receiving frequency tuned in by the receiving circuit 510 and a deterioration in receiving characteristics can be eliminated steadily.

When a radio system is so constructed as to fulfil the functions of the first and second embodiments, this system can steadily eliminate both a deterioration in transmitting characteristics and a deterioration in receiving characteristics.

Figure 3:
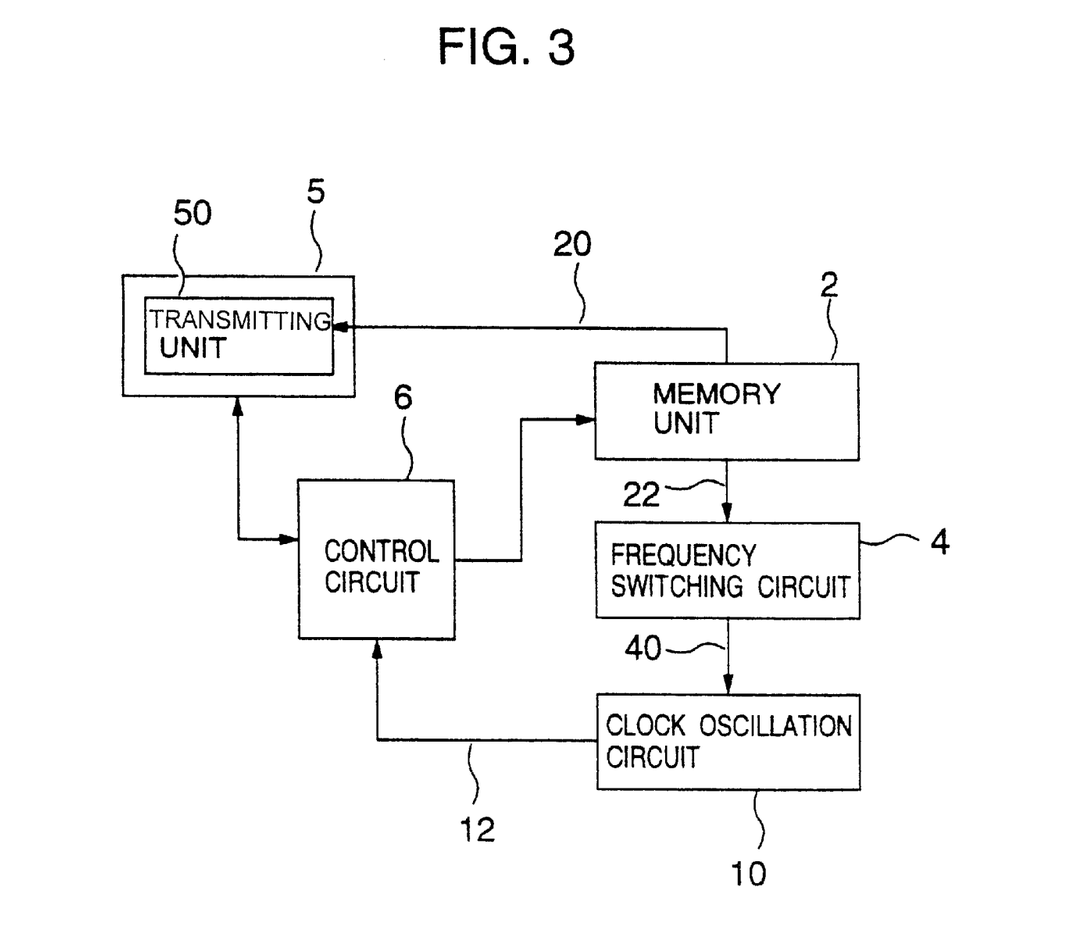
FIG. 3 is a block diagram showing the construction of a radio system according to a third embodiment of the present invention.

FIG. 3 is a schematic diagram showing the construction of a third embodiment of the present invention. As shown in FIG. 3, a radio system of the present embodiment comprises a radio unit 5 having a transmitting circuit 50 for tuning in the transmitting frequency at a desired frequency, a control circuit 6 for performing control of the whole of the radio system, a clock oscillation circuit 10 operative to generate a reference clock for the control circuit 6, a memory circuit 2 for storing transmitting frequencies to be tuned in by the transmitting circuit 50 and conditions for switching the oscillation frequency of the reference clock 12 to be generated by the clock oscillation circuit 10, and a frequency switching circuit 4 for switching the oscillation frequency of the reference clock 12 to be generated by the clock oscillation circuit 10, on the basis of the conditions stored in the memory circuit 2.

The operation of the aforementioned third embodiment will now be described. In the third embodiment, when the radio system is started, the control circuit 6 begins to initialize the individual circuits. At that time, the frequency switching circuit 4 delivers a switching signal 40 for setting the oscillation frequency of the reference clock 12 to be generated by the clock oscillation circuit 10 to a first oscillation frequency. The clock oscillation circuit 10 applied with the switching signal 40 sets the oscillation frequency of the reference clock 12 to the first oscillation frequency. When the initialization ends, the transmitting circuit 50 reads a transmitting frequency from the memory circuit 2, tunes in the transmitting frequency and begins to transmit it. At the same time, the frequency switching circuit 4 reads out of the memory circuit 2 a condition corresponding to the transmitting frequency read out by the transmitting circuit 50. When the condition indicates that radiation of fundamental wave and N-th harmonic of the reference clock 12 is of frequencies which interfere with the transmitting frequency tuned in by the transmitting circuit 50, the frequency switching circuit 4 delivers a switching signal 40 for setting the oscillation frequency of the reference clock 12 to be generated by the clock oscillation circuit 10 to a second oscillation frequency. The clock oscillation circuit 10 applied with the switching signal 40 sets the oscillation frequency of the reference clock 12 to the second oscillation frequency. When the condition read out of the memory circuit 2 indicates that radiation of fundamental wave and N-th harmonic of the reference clock 12 is of frequencies which do not interfere with the transmitting frequency tuned in by the transmitting circuit 50, the frequency switching circuit 4 delivers the switching signal 40 for setting the oscillation frequency of the reference clock to be generated by the clock oscillation circuit 10 to the first oscillation frequency. The clock oscillation circuit 10 applied with the switching signal 40 sets the oscillation frequency of the reference clock 12 to the first oscillation frequency.

Thus, by alternately switching the oscillation frequency of the reference clock 12 to be generated by the clock oscillation circuit 10 to the first and second frequencies in accordance with a transmitting frequency tuned in by the transmitting circuit 50, radiation of electromagnetic waves of the fundamental wave and N-th harmonic of the reference clock 12 to be generated by the clock oscillation circuit 10 can be prevented from interfering with the transmitting frequency tuned in by the transmitting circuit 50 and a deterioration in transmitting characteristics can be eliminated steadily.

Figure 4:
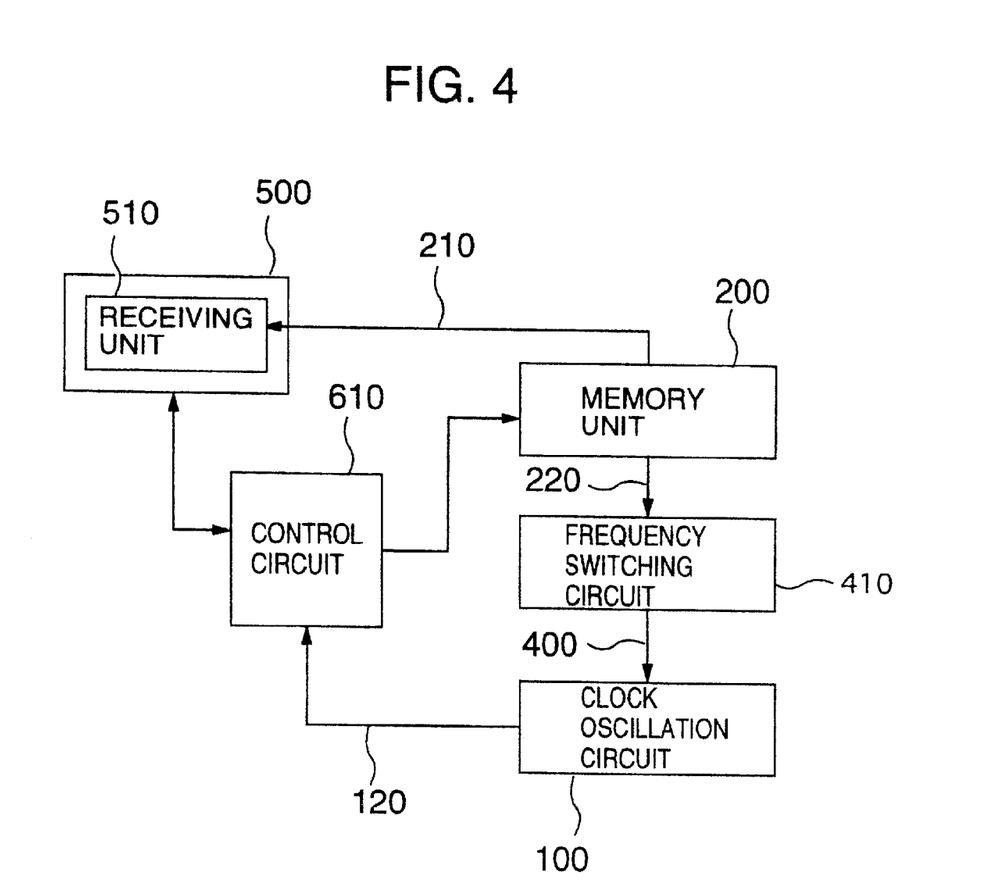
FIG. 4 is a block diagram showing the construction of a radio system according to a fourth embodiment of the present invention.

FIG. 4 is a schematic diagram showing the construction of a fourth embodiment of the present invention. As shown in FIG. 4, a radio system of the present embodiment comprises a radio unit 500 having a receiving circuit 510 for tuning in the receiving frequency at a desired frequency, a control circuit 610 for performing control of the whole of the radio system, a clock oscillation circuit 100 operative to generate a reference clock for the control circuit 610, a memory circuit 200 for storing receiving frequencies to be tuned in by the receiving circuit 510 and conditions for switching the oscillation frequency of the reference clock 120 to be generated by the clock oscillation circuit 100, and a frequency switching circuit 410 for switching the oscillation frequency of the reference clock 120 to be generated by the clock oscillation circuit 100, on the basis of the conditions stored in the memory circuit 200.

Next, the operation of the aforementioned fourth embodiment will be described. In the fourth embodiment, when the radio system is started, the control circuit 610 begins to initialize the individual circuits. At that time, the frequency switching circuit 410 delivers a switching signal 400 for setting the oscillation frequency of the reference clock 120 to be generated by the clock oscillation circuit 100 to a first oscillation frequency. The clock oscillation circuit 100 applied with the switching signal 400 sets the oscillation frequency of the reference clock 120 to the first oscillation frequency. When the initialization ends, the receiving circuit 510 reads a receiving frequency from the memory circuit 200, tunes in the receiving frequency and begins to receive it. At the same time, the frequency switching circuit 410 reads out of the memory circuit 200 a condition corresponding to the receiving frequency read out by the receiving circuit 510. When the condition indicates that radiation of fundamental wave and N-th harmonic of the reference clock 120 is of frequencies which interfere with the receiving frequency tuned in by the receiving circuit 510, the frequency switching circuit 410 delivers a switching signal 400 for setting the oscillation frequency of the reference clock 120 to be generated by the oscillation circuit 100 to a second oscillation frequency. The clock oscillation circuit 100 applied with the switching signal 400 sets the oscillation frequency of the reference clock 120 to the second oscillation frequency. When the condition read out of the memory circuit 200 indicates that radiation of fundamental wave and N-th harmonic of the reference clock 120 is of frequencies which do not interfere with the receiving frequency, the frequency switching circuit 410 delivers the switching signal 400 for setting the oscillation frequency of the reference clock 120 to be generated by the clock oscillation circuit 100 to the first oscillation frequency. The clock oscillation circuit 100 applied with the switching signal 400 sets the oscillation frequency of the reference clock 120 to the first oscillation frequency.

Thus, by alternately switching the oscillation frequency of the reference clock 120 to be generated by the clock oscillation circuit 100 to the first and second frequencies in accordance with a receiving frequency tuned in by the receiving circuit 510, radiation of electromagnetic waves of the fundamental wave and N-th harmonic of the reference clock to be generated by the clock oscillation circuit 100 can be prevented from interfering with the receiving frequency tuned in by the receiving circuit 510 and a deterioration in receiving characteristics can be eliminated steadily.

When a radio system is so constructed as to fulfil the functions of the third and fourth embodiments, this system can steadily eliminate both a deterioration in transmitting characteristics and a deterioration in receiving characteristics.

Figure 5:
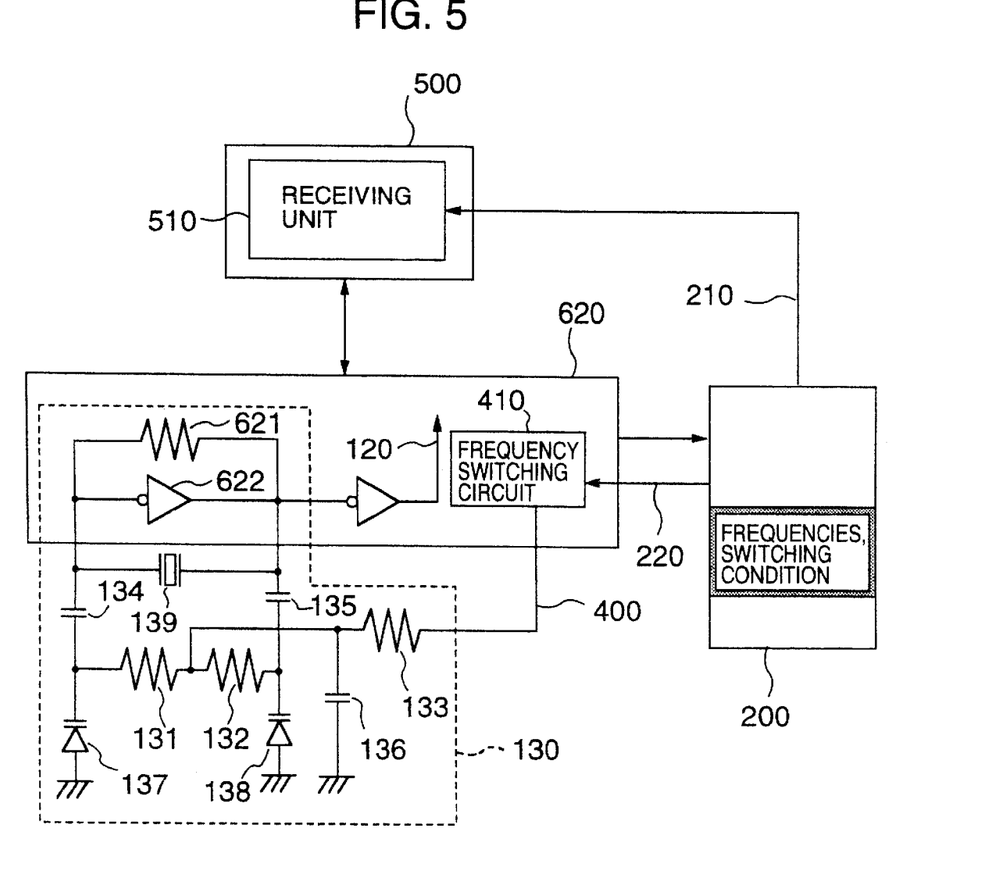
FIG. 5 is a block diagram showing details of the fourth embodiment.

FIG. 5 shows an example of a practical circuit according to a fifth embodiment. As shown in FIG. 5, a radio system comprises a radio unit 500 having a receiving circuit 510 for tuning in the receiving frequency at a desired frequency, a microprocessor 620 for performing control of the whole of the radio system, a quartz oscillation circuit 130 operative to generate a reference clock 120 for the microprocessor 620, a memory circuit 200 for storing receiving frequencies to be tuned in by the receiving circuit 510 and conditions for switching the oscillation frequency of the reference clock 120 to be generated by the quartz oscillation circuit 130, and a frequency switching circuit 410 for switching the oscillation frequency of the reference clock 120 to be generated by the quartz oscillation circuit 130, on the basis of the conditions stored in the memory circuit 200. The memory circuit 200 also stores, in addition to the receiving frequencies and the switching conditions, a program for controlling the microprocessor 610. The frequency switching circuit 410 is realized with one of functions of the microprocessor 620 and can be controlled in terms of software. The quartz oscillation circuit 130 includes a CMOS inverter 622, a feedback resistor 621, the inverter and resistor being incorporated in the microprocessor 620, a quartz oscillator 139, resistors 131, 132 and 133, capacitors 134, 135 and 136 and variable capacity diodes 137 and 138, these latter elements being provided externally of the microprocessor 620.

Figure 7:
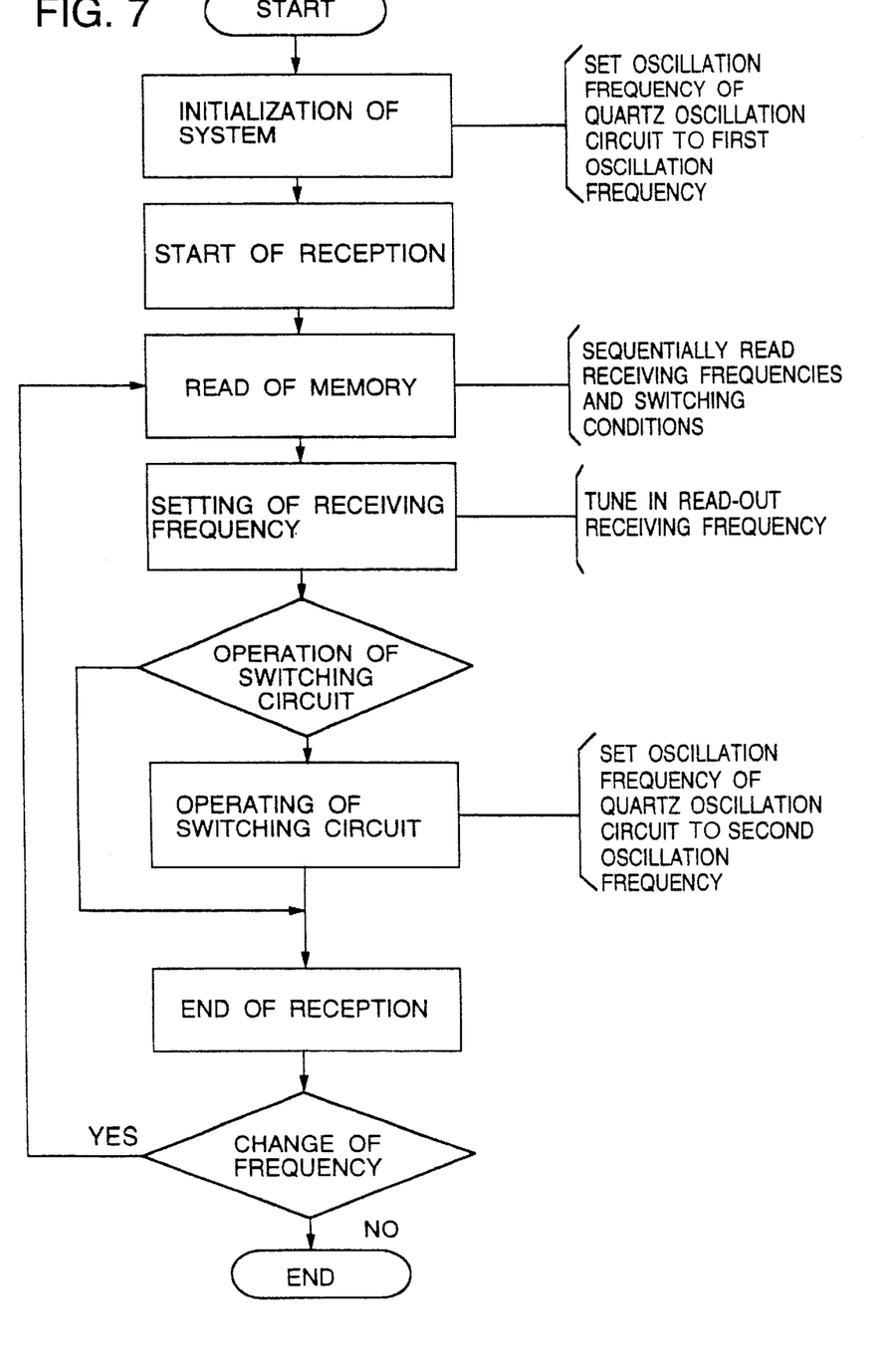
FIG. 7 is a flow chart showing the flow of control by control means.

Next, the operation of the aforementioned fifth embodiment will be described. As shown in FIG. 7, when the radio system is started, the microprocessor 620 begins to initialize the individual circuits. At that time, the frequency switching circuit 410 delivers a switching signal 400 for setting the oscillation frequency of the reference clock 120 to be generated by the quartz oscillation circuit 130 to a first oscillation frequency. The quartz oscillation circuit 130 applied with the switching signal 400 sets the oscillation frequency of the reference clock 120 to the first oscillation frequency. When the initialization ends, the receiving circuit 510 reads a receiving frequency from the memory circuit 200, tunes in the receiving frequency and begins to receive it. At the same time, the frequency switching circuit 410 reads out of the memory circuit 200 a condition corresponding to the receiving frequency read out by the receiving circuit 510. When the condition indicates that radiation of fundamental wave and N-th harmonic of the reference clock 120 to be generated by the quartz oscillation circuit 130 is of frequencies which interfere with the receiving frequency tuned in by the receiving circuit 510, the frequency switching circuit 410 delivers a switching signal 400 for setting the oscillation frequency of the reference clock 120 to be generated by the quartz oscillation circuit 130 to a second oscillation frequency. When the condition read out of the memory circuit 200 indicates that radiation of fundamental wave and N-th harmonic of the reference clock 120 is of frequencies which do not interfere with the receiving frequency tuned in by the receiving circuit 510, the frequency switching circuit 410 delivers the switching signal 400 for setting the oscillation frequency of the reference clock 120 to be generated by the quartz oscillation circuit 130 to the first oscillation frequency. The quartz oscillation circuit 130 applied with the switching signal 400 sets the oscillation frequency of the reference clock 120 to the first oscillation frequency.

Thus, by alternately switching the oscillation frequency of the reference clock 120 to be generated by the quartz oscillation circuit 130 to the first and second frequencies in accordance with a receiving frequency tuned in by the receiving circuit 510, radiation of electromagnetic waves of the fundamental wave and N-th harmonic of the reference clock to be generated by the quartz oscillation circuit 130 can be prevented from interfering with the receiving frequency tuned in by the receiving circuit 510 and a deterioration in receiving characteristics can be eliminated steadily.

The operation of the quartz oscillation circuit 130 will be described in greater detail. The quartz oscillation circuit 130 using the quartz oscillator 139 makes use of a geometrical natural oscillation of quartz to generate an oscillation frequency of less error and therefore it does not require such means as used in the prior art example of FIG. 8 for measuring the oscillation frequency of a reference clock. In the oscillation circuit using the quartz oscillator, the oscillation frequency can be finely adjusted by changing the additional capacitance and in the present embodiment, changing the oscillation frequency through the fine adjustment is utilized to generate the first and second oscillation frequencies of the reference clock 120. More particularly, by changing voltage of the switching signal 400, the capacitance of the variable capacitance diodes 137 and 138 is electrically changed. When the switching signal 400 is at a high level, the capacitance of the variable capacitance diodes 137 and 138 is decreased and conversely, when the switching signal 400 is at a low level, the capacitance of the variable capacitance diodes 137 and 138 is increased. The capacitors 134 and 135 cut a DC component of the switching signal 400 to prevent the quartz oscillator 139 from stopping oscillating. A circuit of resistor 133 and capacitor 136 interposed between a line for switching signal 400 delivered out of the microprocessor 620 and the variable capacitance diodes 137 and 138 is adapted to increase the rise and fall times of the switching signal 400 to thereby permit a gradual change in capacitance in order to prevent a decrease in oscillation amplitude and stoppage of oscillation of the quartz oscillator which are caused when the capacitance changes abruptly.

Figure 6:
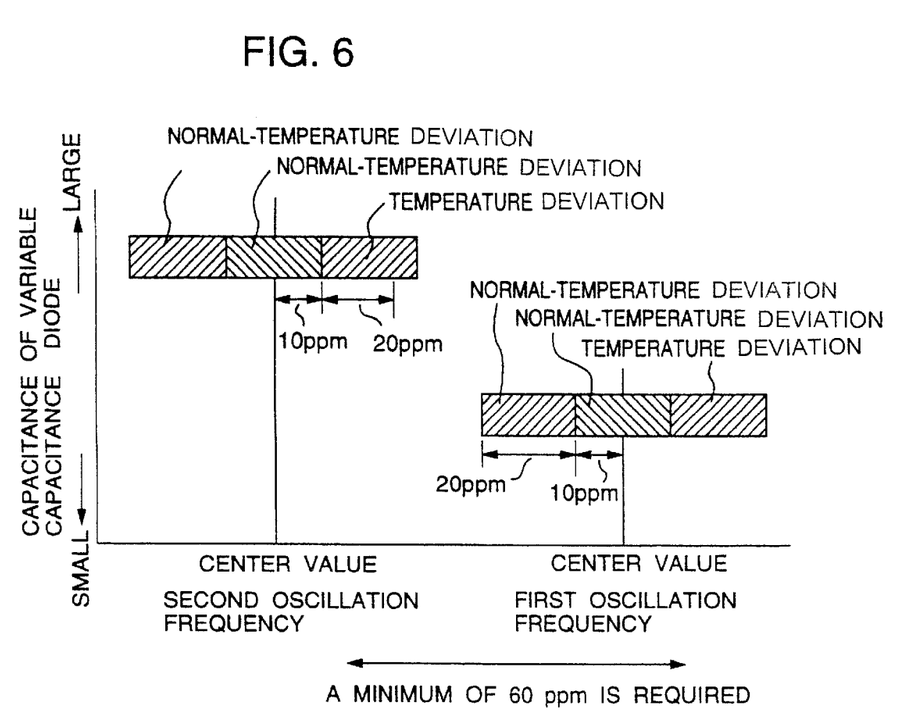
FIG. 6 is a graph showing a method for determination of first and second frequencies of clock oscillation means.

In determining a change in oscillation frequency of the quartz oscillation circuit 130, an amount of frequency shift enough to completely avoid reception interference must be determined by taking into account a normal-temperature dependent deviation of oscillation frequency (normal-temperature deviation) due to irregularity in production of the quartz oscillator and a temperature-change dependent deviation of oscillation frequency (temperature deviation) due to changes in ambient temperature. For example, on the assumption that according to specifications of a quartz oscillator used, the normal temperature deviation is ±10 ppm, the temperature deviation is ±20 ppm and the original oscillation is 2 MHz, the frequency shift amount needs to be 60 ppm or more, that is, 120 Hz or more. Under consideration of characteristics of the quartz oscillator in which the frequency shifts to a lower value as the temperature rises and to a higher value as the temperature falls as well as heat generated inside the radio system during call, frequency shift at higher temperature is predominantly considered and the direction of frequency shift is determined to be negative-going. Namely, the first oscillation frequency, serving as reference oscillation frequency, has a higher value than the second oscillation frequency.

In the fifth embodiment set forth so far, the contents to be stored in the memory circuit 200 may be the contents for improvement of radio characteristics other than the contents represented by conditions for searching a deterioration in radio characteristics due to interference of radiation of fundamental wave and Nth harmonic of the reference clock 120 to be generated by the quartz oscillation circuit 130 with a frequency tuned in by the radio unit 500.

As is clear from the foregoing embodiments of the present invention, by alternately switching the oscillation frequency of the reference clock 12 to be generated by the clock oscillation circuit 10 to the first and second frequencies in accordance with a frequency tuned in by the radio unit 5, radiation of electromagnetic waves of the fundamental wave and N-th harmonic of the reference clock can be prevented from interfering with the frequency tuned in by the radio unit 5 and a deterioration in radio characteristics can be eliminated steadily, thereby attaining meritorious effects that the conventional countermeasure parts such as shield case and capacitors can be removed to reduce size and weight and trial production for improvement of radio characteristics can be dispensed with to permit development and design to be completed within a short period of time. Further, according to the present invention, a deterioration in radio characteristics can be eliminated steadily with a simplified system configuration and so the elimination effect can be attained regardless of irregularity in parts and production to thereby improve the yield during production.

What is claimed is:

1. A radio system comprising:

transmitting means for tuning in a transmitting frequency at a desired frequency;

control means for performing control of a whole of said radio system;

clock oscillation means, comprising a variable capacitance diode, operative to generate a reference clock for said control means;

memory means operative to store conditions for switching the oscillation frequency of the reference clock to be generated by said clock oscillation means;

comparative arithmetic means for comparing said transmitting frequency tuned in by said transmitting means with the conditions stored in said memory means; and frequency switching means for switching the oscillation frequency of the reference clock to be generated by said clock oscillation means, on the basis of a result of comparison by said comparative arithmetic means, wherein said frequency switching means is controlled using a result of comparison by said comparative arithmetic means, and the oscillation frequency of the reference clock to be generated by said clock oscillation means is switched in accordance with a state of an output of said frequency switching means.

2. A radio system comprising:

receiving means for tuning in a receiving frequency at a desired frequency;

control means for performing control of a whole said radio system;

clock oscillation means, comprising a variable capacitance diode, operative to generate a reference clock for said control means;

memory means operative to store conditions for switching the oscillation frequency of the reference clock to be generated by said clock oscillation means;

comparative arithmetic means for comparing said receiving frequency tuned in by said receiving means with the conditions stored in said memory means; and frequency switching means for switching the oscillation frequency of the reference clock to be generated by said clock oscillation means, on the basis of a result of comparison by said comparative arithmetic means, wherein said frequency switching means is controlled using a result of comparison by said comparative arithmetic means, and the oscillation frequency of the reference clock to be generated by said clock oscillation means is switched in accordance with a state of an output of said frequency switching means.

3. A radio system comprising first and second sub-radio systems, said first sub-radio system including:

transmitting means for tuning in a transmitting frequency at a desired frequency;

control means for performing control of a whole of said first sub-radio system;

clock oscillation means, comprising a variable capacitance diode, operative to generate a reference clock for said control means;

memory means operative to store conditions for switching the oscillation frequency of the reference clock to be generated by said clock oscillation means;

comparative arithmetic means for comparing said transmitting frequency tuned in by said transmitting means with the conditions stored in said memory means; and frequency switching means for switching the oscillation frequency of the reference clock to be generated by said clock oscillation means, on the basis of a result of comparison by said comparative arithmetic means, wherein said frequency switching means is controlled using a result of comparison by said comparative arithmetic means, and the oscillation frequency of the reference clock to be generated by said clock oscillation means is switched in accordance with a state of an output of said frequency switching means, said second sub-radio system including:

receiving means for tuning in a receiving frequency at a desired frequency;

control means for performing control of a whole of said second sub-radio system;

clock oscillation means, comprising a variable capacitance diode, operative to generate a reference clock for said control means;

memory means operative to store conditions for switching the oscillation frequency of the reference clock to be generated by said clock oscillation means;

comparative arithmetic means for comparing said receiving frequency tuned in by said receiving means with the conditions stored in said memory means; and frequency switching means for switching the oscillation frequency of the reference clock to be generated by said clock oscillation means, on the basis of a result of comparison by said comparative arithmetic means, wherein said frequency switching means is controlled using a result of comparison by said comparative arithmetic means, and the oscillation frequency of the reference clock to be generated by said clock oscillation means is switched in accordance with a state of an output of said frequency switching means.

4. A radio system comprising:

transmitting means for tuning in a transmitting frequency at a desired frequency;

control means for performing control of a whole of said radio system;

clock oscillation means, comprising a variable capacitance diode, operative to generate a reference clock for said control means;

memory means for storing transmitting frequencies to be tuned in by said transmitting means and conditions for switching the oscillation frequency of the reference clock to be generated by said clock oscillation means; and frequency switching means for switching the oscillation frequency of the reference clock to be generated by said clock oscillation means, on the basis of the conditions stored in said memory means, wherein said transmitting means tunes in one of said transmitting frequencies stored in said memory means, said frequency switching means is controlled on the basis of one of said conditions stored in said memory means and corresponding to said one of said transmitting frequencies, and the oscillation frequency of the reference clock to be generated by said clock oscillation means is switched in accordance with a state of an output of said frequency switching means.

5. A radio system comprising:

receiving means for tuning in a receiving frequency at a desired frequency;

control means for performing control of a whole of said radio system;

clock oscillation means, comprising a variable capacitance diode, operative to generate a reference clock for said control means;

memory means for storing receiving frequencies to be tuned in by said receiving means and conditions for switching the oscillation frequency of the reference clock to be generated by said clock oscillation means; and frequency switching means for switching the oscillation frequency of the reference clock to be generated by said clock oscillation means, on the basis of the conditions stored in said memory means, wherein said receiving means tunes in one of said receiving frequencies stored in said memory means, said frequency switching means is controlled on the basis of one of said conditions stored in said memory means and corresponding to said one of said receiving frequencies, and the oscillation frequency of the reference clock to be generated by said clock oscillation means is switched in accordance with a state of an output of said frequency switching means.

6. A radio system comprising first and second sub-radio systems, said first sub-radio system including:

transmitting means for tuning in a transmitting frequency at a desired frequency;

control means for performing control of a whole of said first sub-radio system;

clock oscillation means, comprising a variable capacitance diode, operative to generate a reference clock for said control means;

memory means for storing transmitting frequencies to be tuned in by said transmitting means and conditions for switching the oscillation frequency of the reference clock to be generated by said clock oscillation means; and frequency switching means for switching the oscillation frequency of the reference clock to be generated by said clock oscillation means, on the basis of the conditions stored in said memory means, wherein said transmitting means tunes in one of said transmitting frequencies stored in said memory means, said frequency switching means is controlled on the basis of one of said conditions stored in said memory means and corresponding to said one of said transmitting frequencies, and the oscillation frequency of the reference clock to be generated by said clock oscillation means is switched in accordance with a state of an output of said frequency switching means, said second sub-radio system including receiving means for tuning in a receiving frequency at a desired frequency;

control means for performing control of a whole of said second sub-radio system;

clock oscillation means, comprising a variable capacitance diode, operative to generate a reference clock for said control means;

memory means for storing receiving frequencies to be tuned in by said receiving means and conditions for switching the oscillation frequency of the reference clock to be generated by said clock oscillation means; and frequency switching means for switching the oscillation frequency of the reference clock to be generated by said clock oscillation means, on the basis of the conditions stored in said memory means, wherein said receiving means tunes in one of said receiving frequencies stored in said memory means, said frequency switching means is controlled on the basis of one of said conditions stored in said memory means and of said receiving frequencies, and the oscillation frequency of the reference clock to be generated by said clock oscillation means is switched in accordance with a state of an output of said frequency switching means.

* * * * *